(12) United States Patent
Chen

(10) Patent No.: US 8,414,007 B2
(45) Date of Patent: Apr. 9, 2013

(54) BALANCE BIKE

(76) Inventor: Wang-Chuan Chen, Taichung (TW)

( * ) Notice: Subject to any disclaimer, the term of this patent is extended or adjusted under 35 U.S.C. 154(b) by 17 days.

(21) Appl. No.: 13/188,509

(22) Filed: Jul. 22, 2011

(65) Prior Publication Data
US 2013/0020777 A1 Jan. 24, 2013

(51) Int. Cl.
*B62K 15/00* (2006.01)
*B62K 21/24* (2006.01)

(52) U.S. Cl.
USPC .......................................... 280/278; 280/287

(58) Field of Classification Search ................. 280/287, 280/278, 87.05; 180/218, 219, 208, 209; D12/111
See application file for complete search history.

(56) References Cited

U.S. PATENT DOCUMENTS

| 4,582,335 | A | * | 4/1986 | Paioli et al. | 280/278 |
|---|---|---|---|---|---|
| 4,600,207 | A | * | 7/1986 | Zosi | 280/279 |
| 4,909,537 | A | * | 3/1990 | Tratner | 280/278 |
| 5,823,554 | A | * | 10/1998 | Lau | 280/261 |
| 6,880,848 | B2 | * | 4/2005 | Liu | 280/287 |
| 7,300,066 | B2 | * | 11/2007 | Kettler et al. | 280/287 |
| 7,306,249 | B2 | * | 12/2007 | Kwok et al. | 280/278 |
| D629,049 | S | | 12/2010 | McFarland | D21/419 |
| 2003/0001351 | A1 | * | 1/2003 | Schauble et al. | 280/87.05 |
| 2004/0061304 | A1 | * | 4/2004 | Lim | 280/278 |

FOREIGN PATENT DOCUMENTS

DE 20021368 U1 * 4/2002

* cited by examiner

*Primary Examiner* — Paul N Dickson
*Assistant Examiner* — Daniel Yeagley
(74) *Attorney, Agent, or Firm* — Alan Kamrath; Kamrath IP Lawfirm, P.A.

(57) ABSTRACT

A balance bike includes a frame, front and rear wheels, a seat, a joining structure, a front fork, and a steering handle. The joining structure is pivotally joined to the frame and pivotal between first and second positions. The joining structure includes a joining end and a receiving end. The front and rear wheels are disposed apart from each other, and the balance bike defines a first longitudinal dimension when the joining structure is in the first position. The front and rear wheels are disposed adjacent to each other, and the balance bike defines a second longitudinal dimension when the joining structure is in the second position. The first longitudinal dimension is larger than the second longitudinal dimension.

8 Claims, 15 Drawing Sheets

BALANCE BIKE

BACKGROUND OF THE INVENTION

1. Field of the Invention

The present invention relates to a balance bike.

2. Description of the Related Art

U.S. Design Pat. No. D629,049 shows a running bike. It is appreciated that the running bike can be used as a balance bike. A toddler can walk the running bike while sitting on a seat of the running bike. The running bike includes a bike frame, front and rear wheels, a steering handle, and a seat. The front and rear wheels are utilized for the mobility of the running bike. The toddler steers the steering handle in the direction where he/she wants to go and sits on the seat while riding the running bike. The running bike can not be folded more compact. Therefore, it takes space and is liable to suffer a relatively high delivery cost. Furthermore, it is appreciated that the running bike includes the steering handle that can be turned about 360 degrees, but, unfortunately, it is unsafe for the toddler.

The present invention is, therefore, intended to obviate or at least alleviate the problems encountered in the prior art.

SUMMARY OF THE INVENTION

According to the present invention, a balance bike includes a frame, a rear wheel, a seat, a joining structure, a front fork, a front wheel, and a steering handle. The frame includes first and second connecting portions. The rear wheel is engaged with the frame. The seat is engaged with the frame. The seat is adjustable to different heights relative to the frame. The joining structure is pivotally joined to the frame and pivotal between first and second positions. The joining structure includes a joining end and a receiving end. The joining structure and the frame include a first pivot interconnecting therewith for connection between the joining structure and the frame. The first pivot is engaged with the first connecting portion and the joining end. The joining structure and the frame also include a positioning mechanism engaged therewith. The positioning mechanism includes a detent engaged with the second connecting portion and the joining end. The detent is disposed at a first location when the joining structure is in the first position and at a second location when the joining structure is in the second position respectively. The front fork is rotatably engaged with the receiving end of the joining structure. The front wheel is engaged with the front fork. The steering handle is engaged with the front fork.

Furthermore, the front and rear wheels are disposed apart from each other, and the balance bike defines a first longitudinal dimension when the joining structure is in the first position. Likewise, the front and rear wheels are disposed adjacent to each other, and the balance bike defines a second longitudinal dimension when the joining structure is in the second position. The first longitudinal dimension is larger than the second longitudinal dimension.

It is an object of the present invention to provide a balance bike that can be folded into a compact form.

Other objects, advantages, and new features of the present invention will become apparent from the following detailed description of the invention when considered in conjunction with the accompanied drawings.

DETAILED DESCRIPTION OF THE PREFERRED EMBODIMENTS

Figure 1:
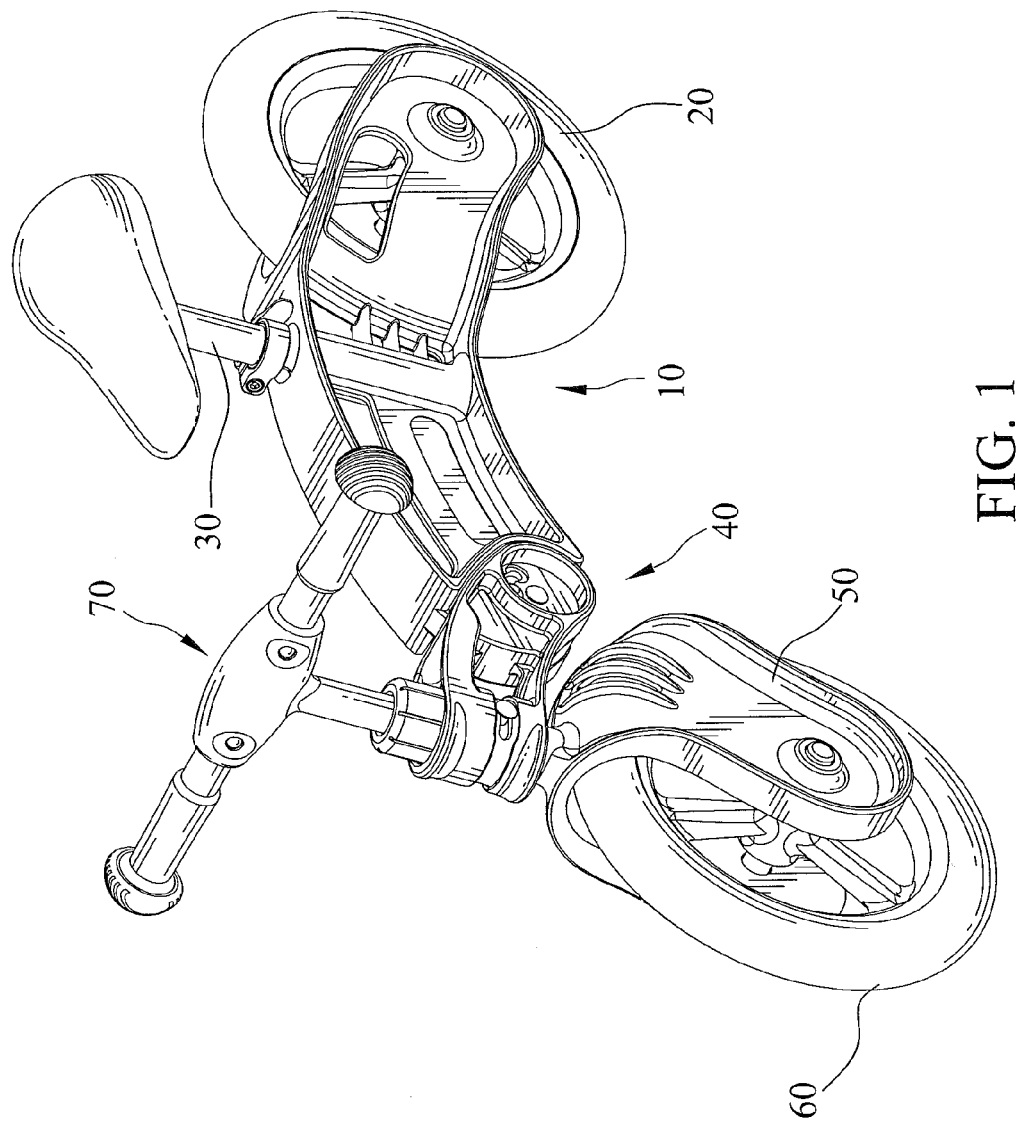
FIG. 1 is a perspective view of a balance bike in accordance with a first embodiment of the present invention.
Figure 2:
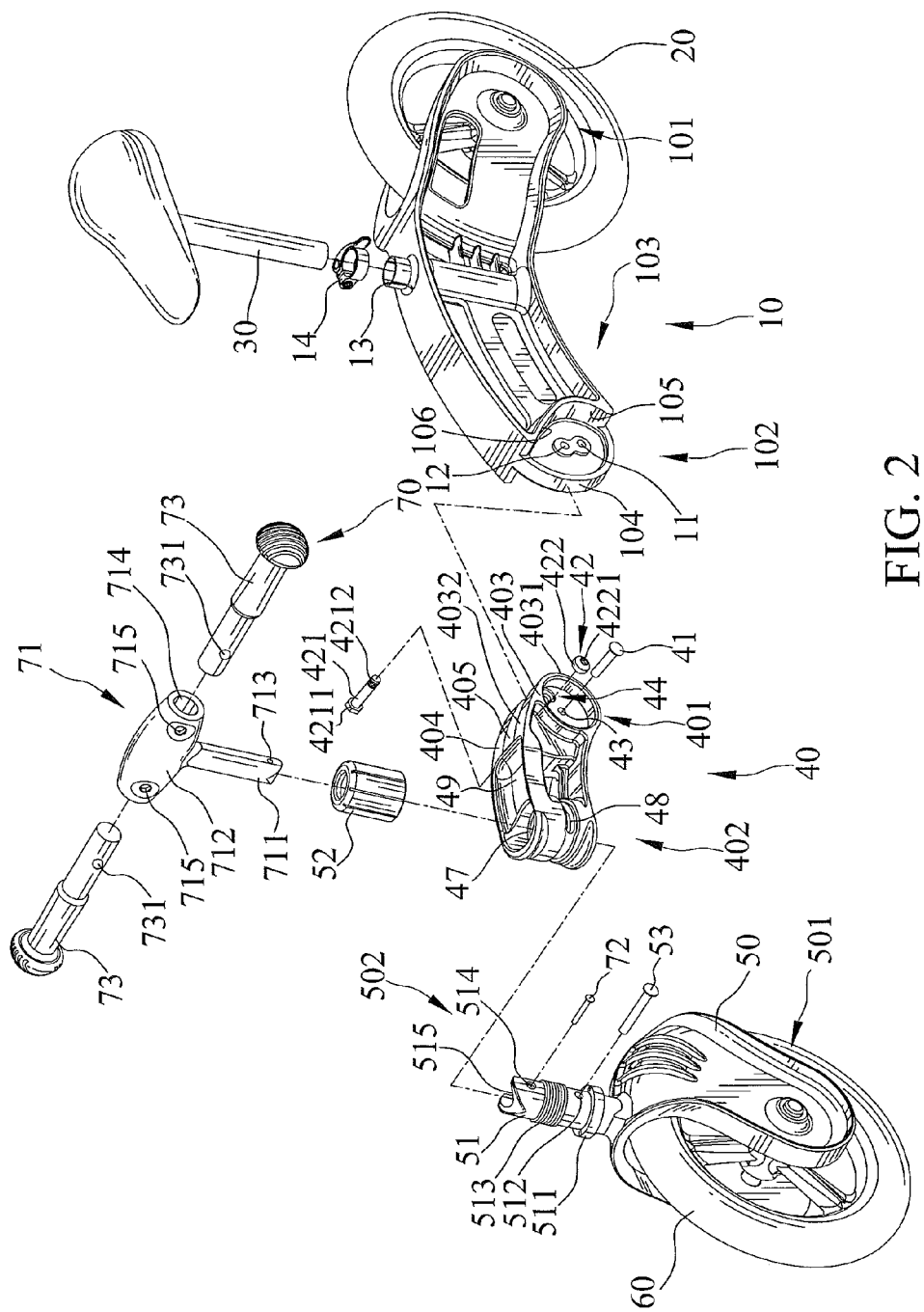
FIG. 2 is an exploded perspective view of the balance bike of FIG. 1.
Figure 3:
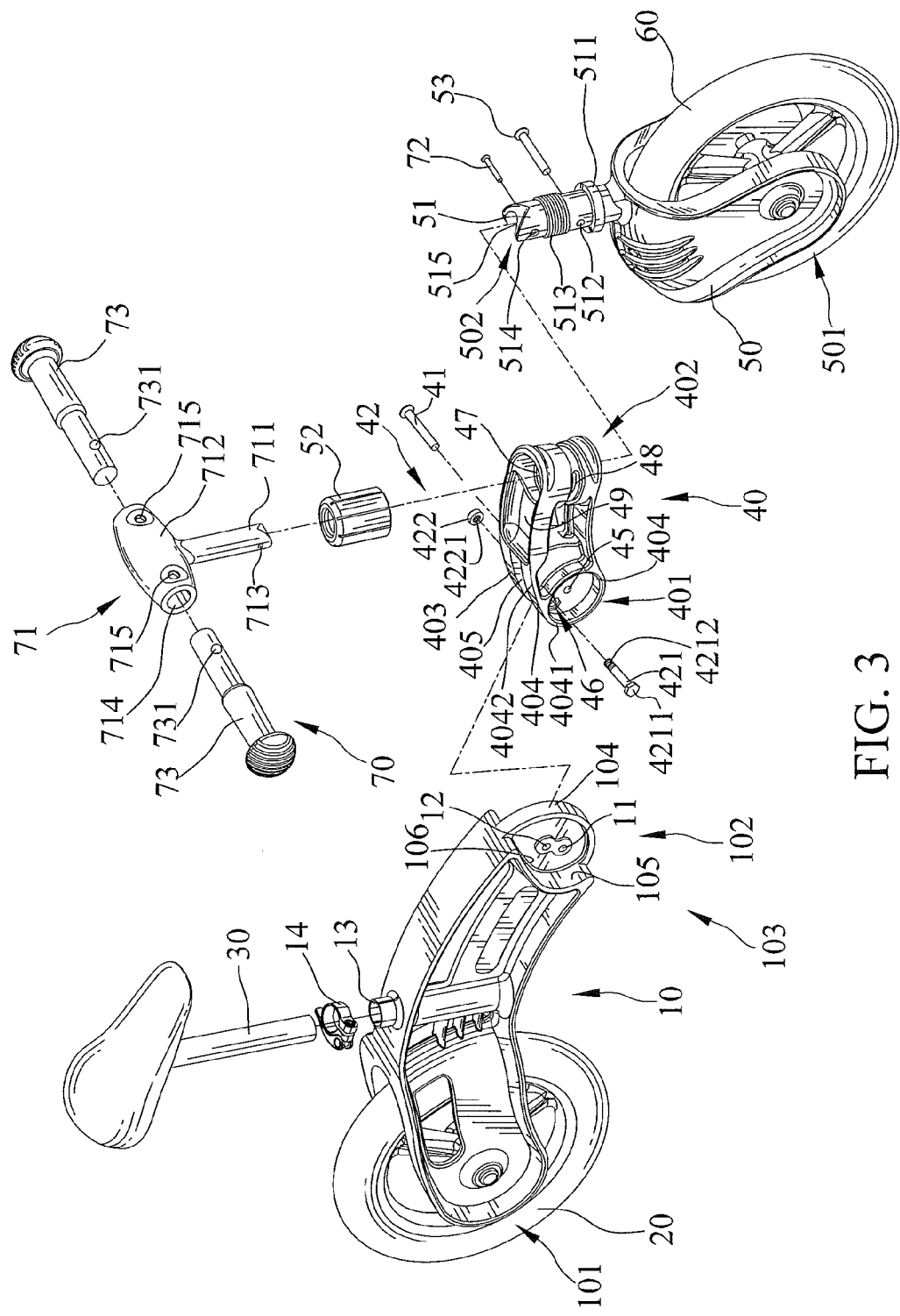
FIG. 3 is an exploded perspective view of the balance bike of FIG. 1, taken from a different view than that of FIG. 2.
Figure 4:
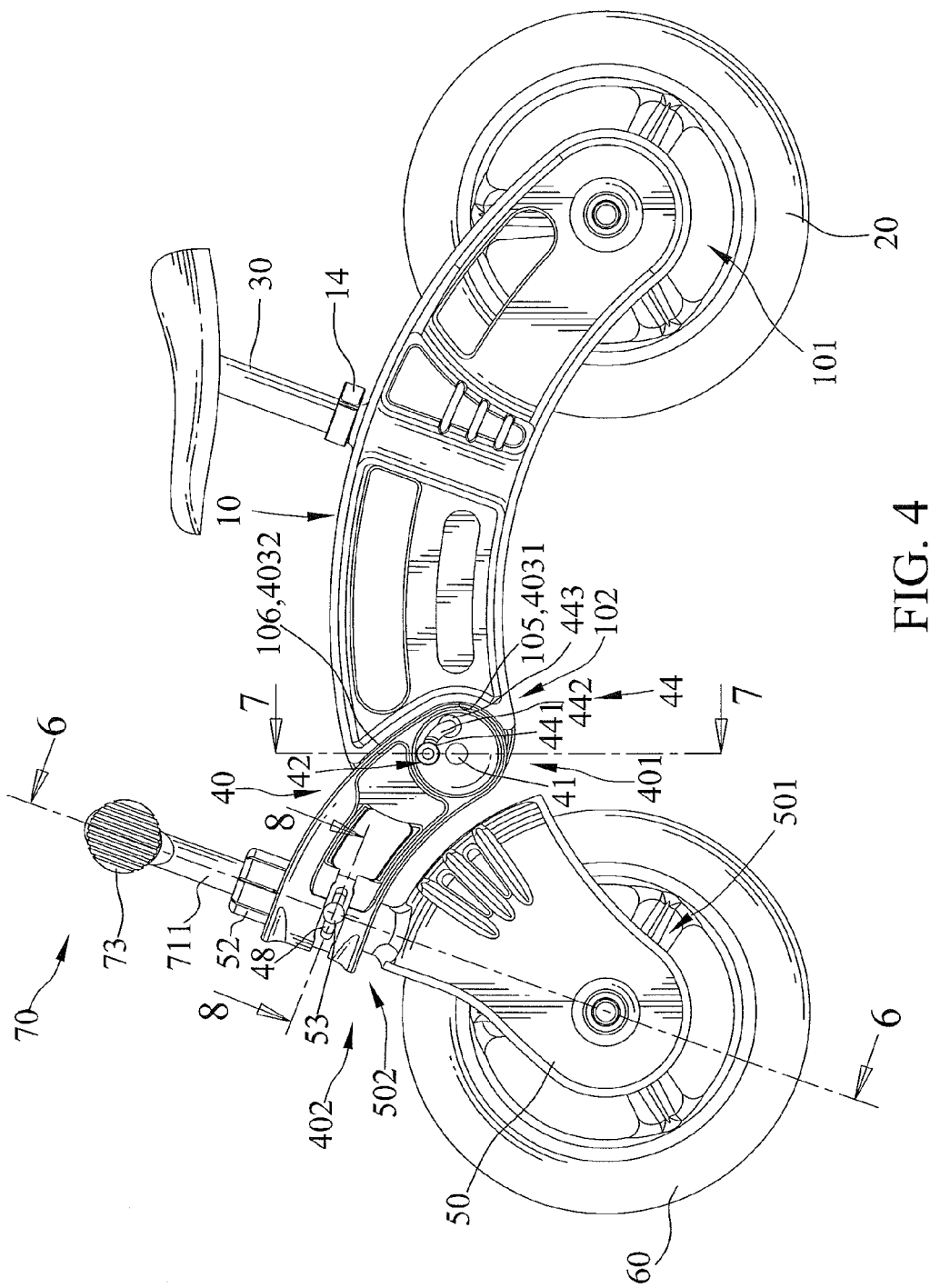
FIG. 4 is a front view of the balance bike of FIG. 1 and shows front and rear wheels disposed apart from each other.
Figure 5:
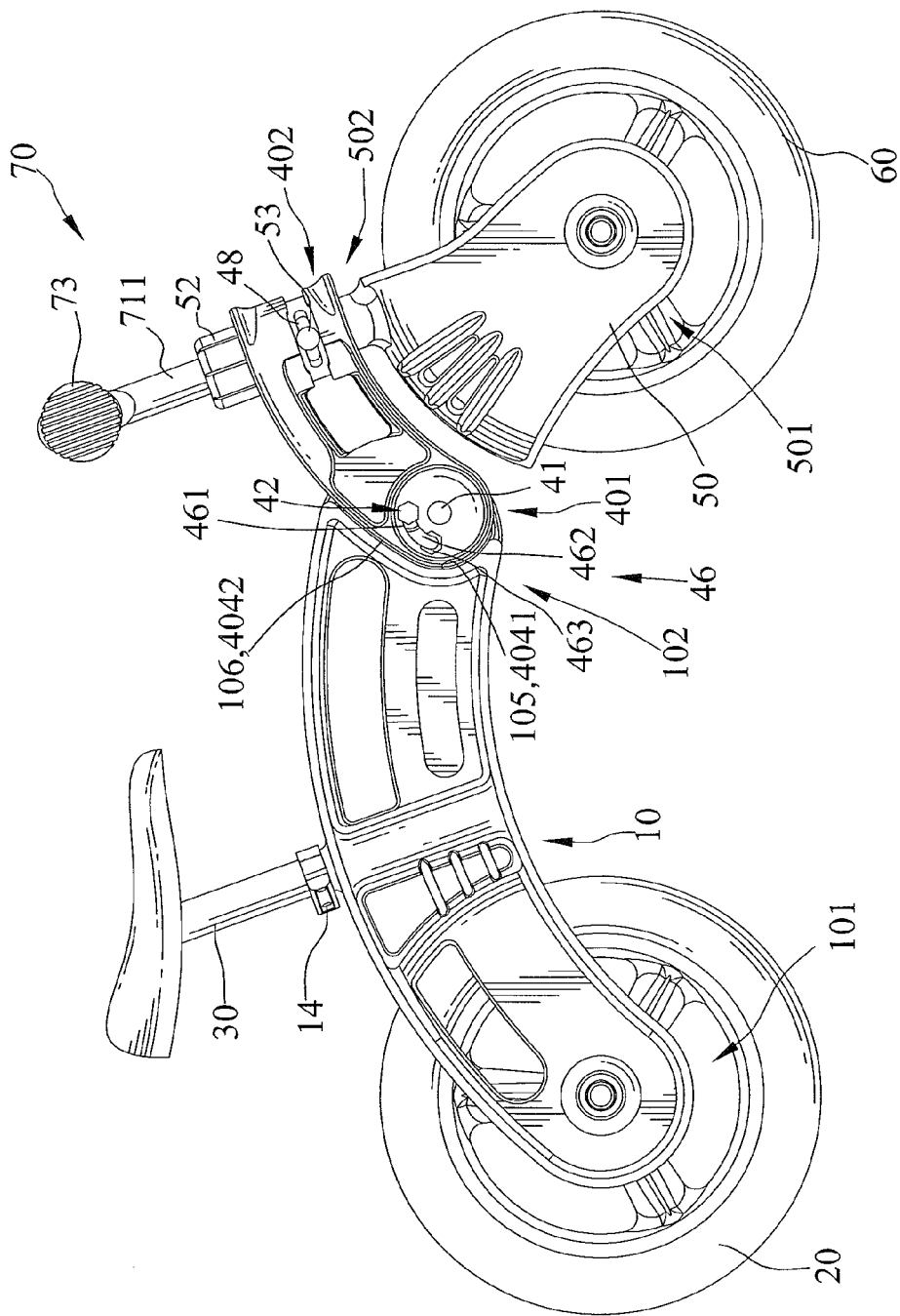
FIG. 5 is a rear view of the balance bike of FIG. 1.
Figure 6:
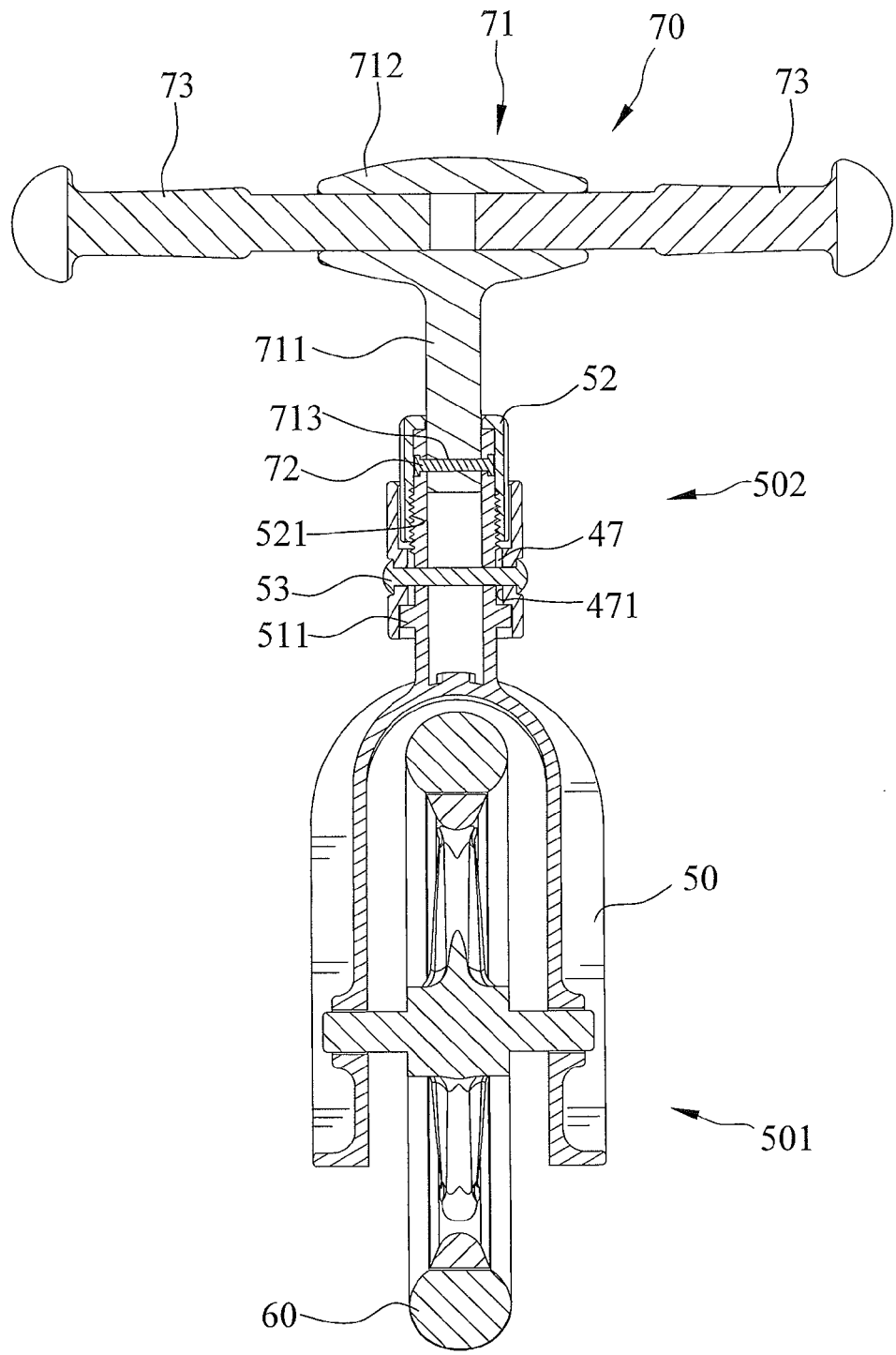
FIG. 6 is a cross-sectional view taken along line 6-6 of FIG. 4.
Figure 7:
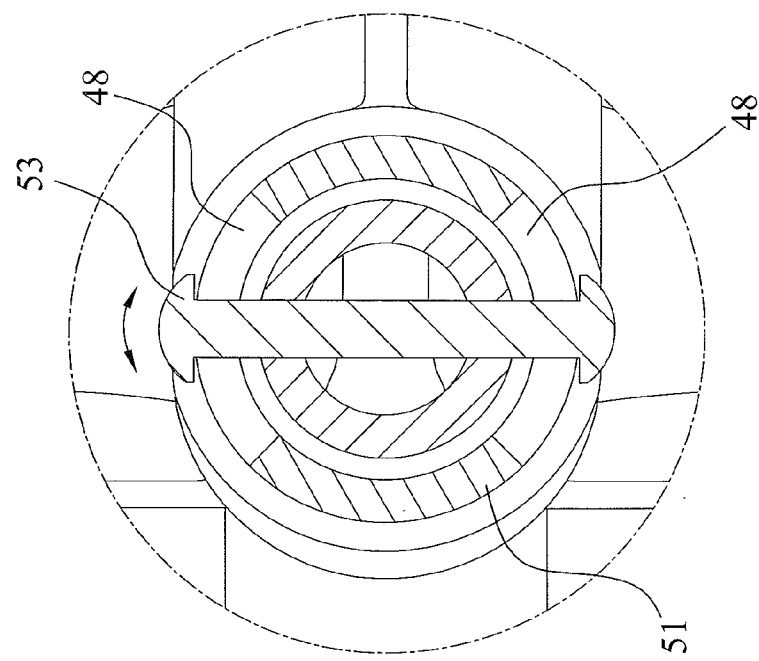
FIG. 7 is a cross-sectional view taken along line 7-7 of FIG. 4.
Figure 8:
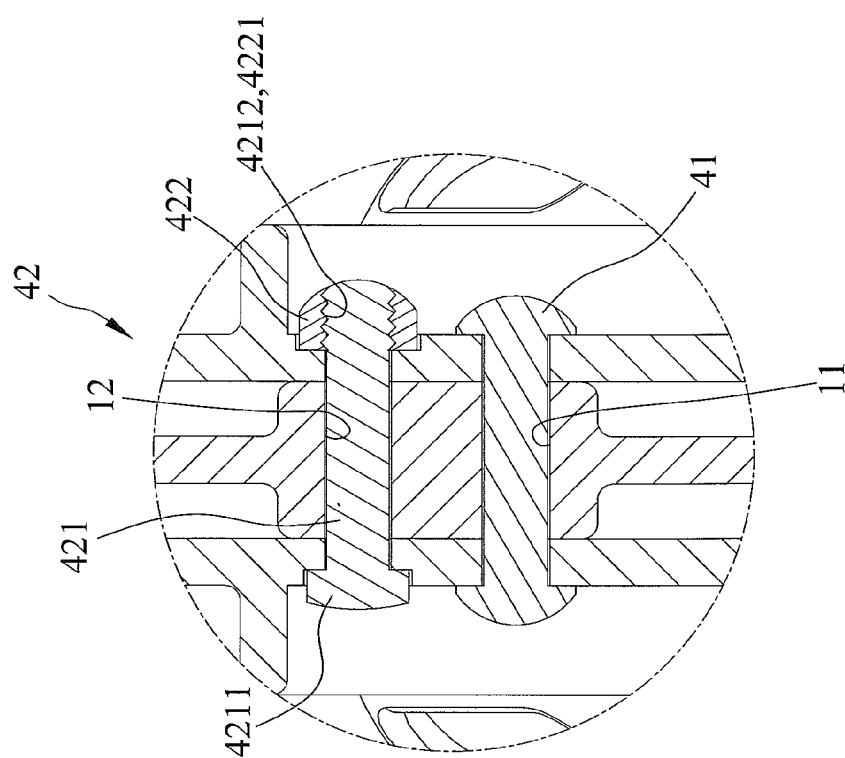
FIG. 8 is a cross-sectional view taken along line 8-8 of FIG. 4.
Figure 9:
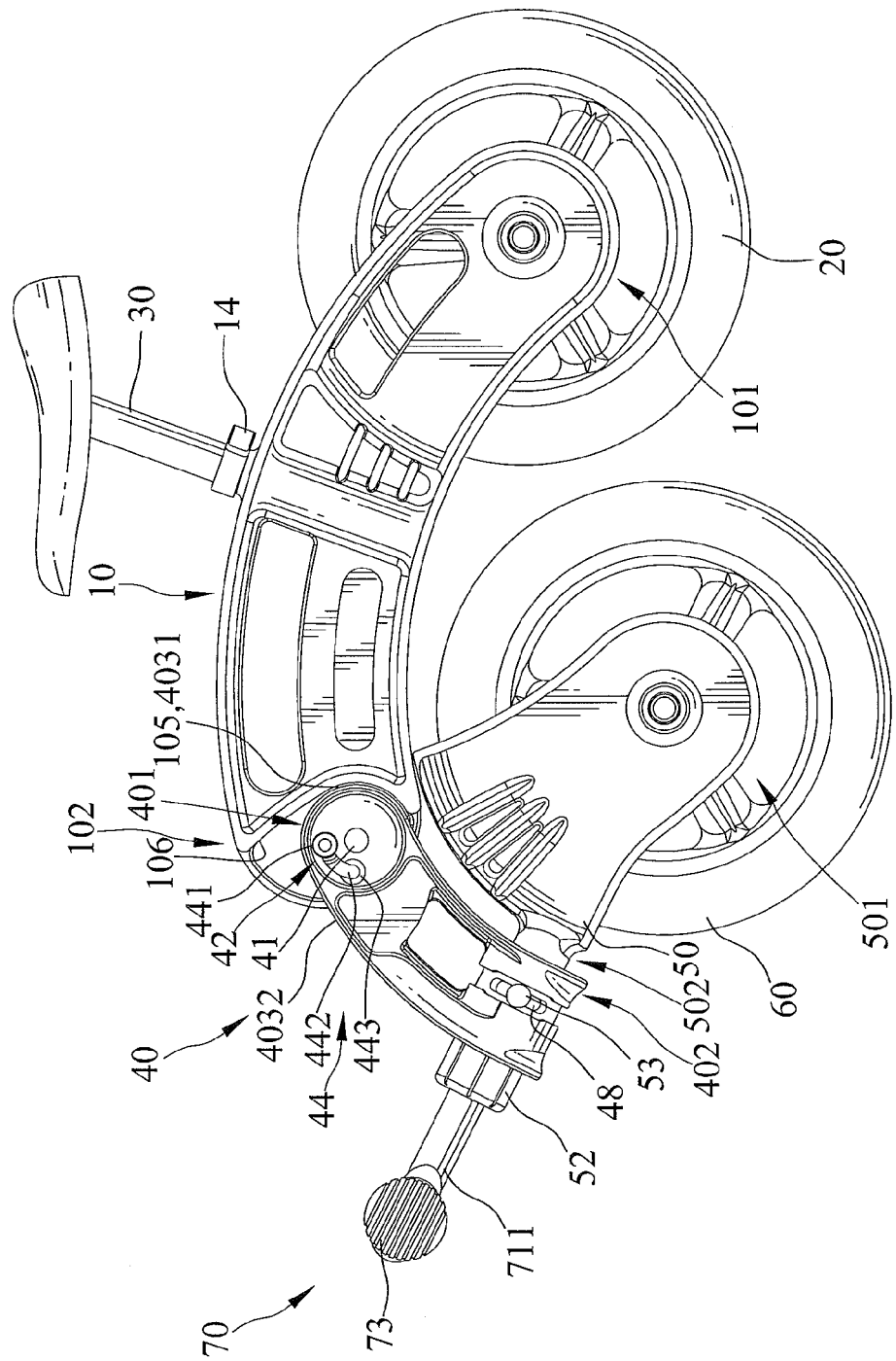
FIG. 9 is a front view of the balance bike of FIG. 1 and shows the front and rear wheels disposed adjacent to each other.
Figure 10:
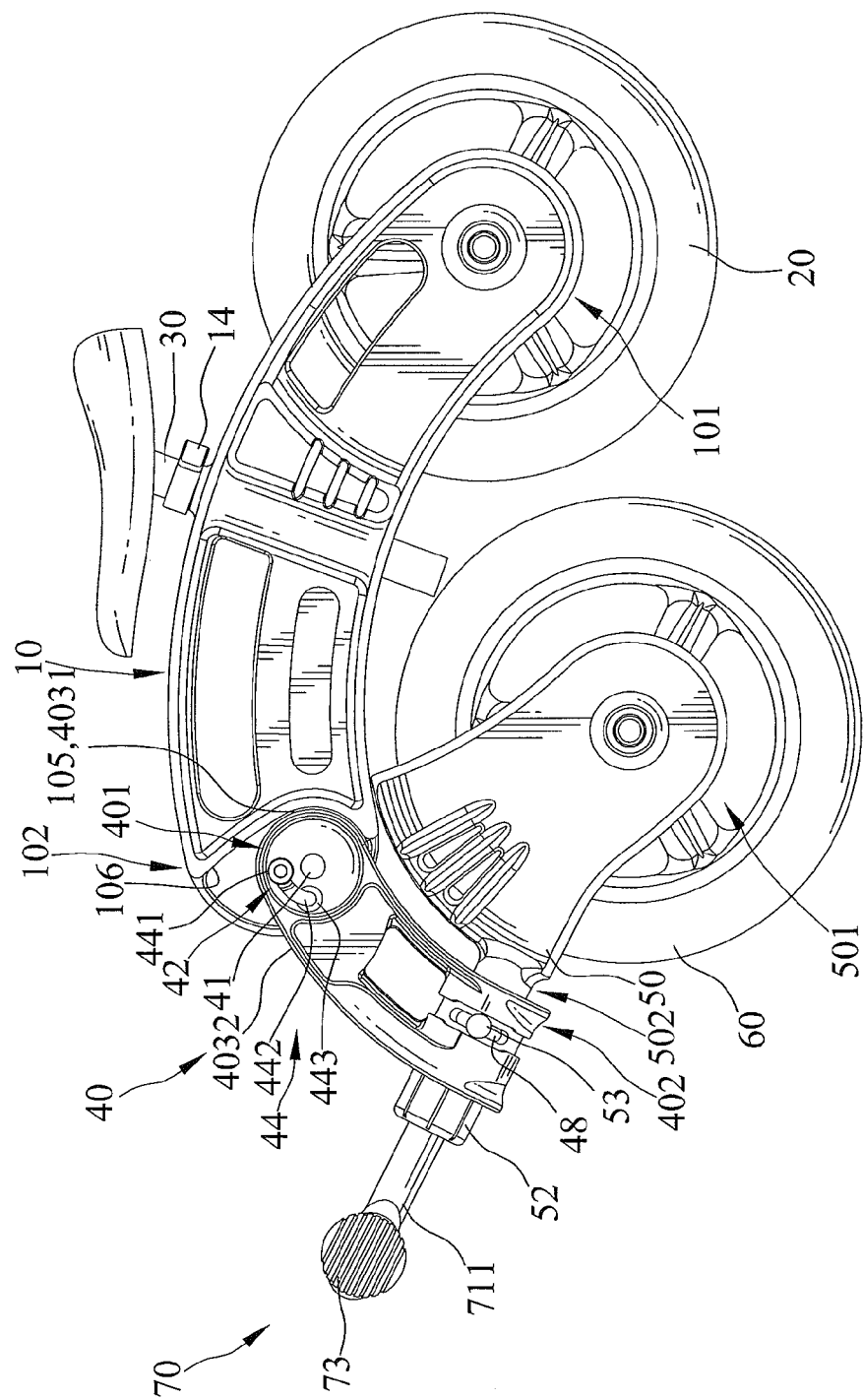
FIG. 10 is a front view similar to that of FIG. 9, but shows a seat disposed at a height lower than that of FIG. 9.
Figure 11:
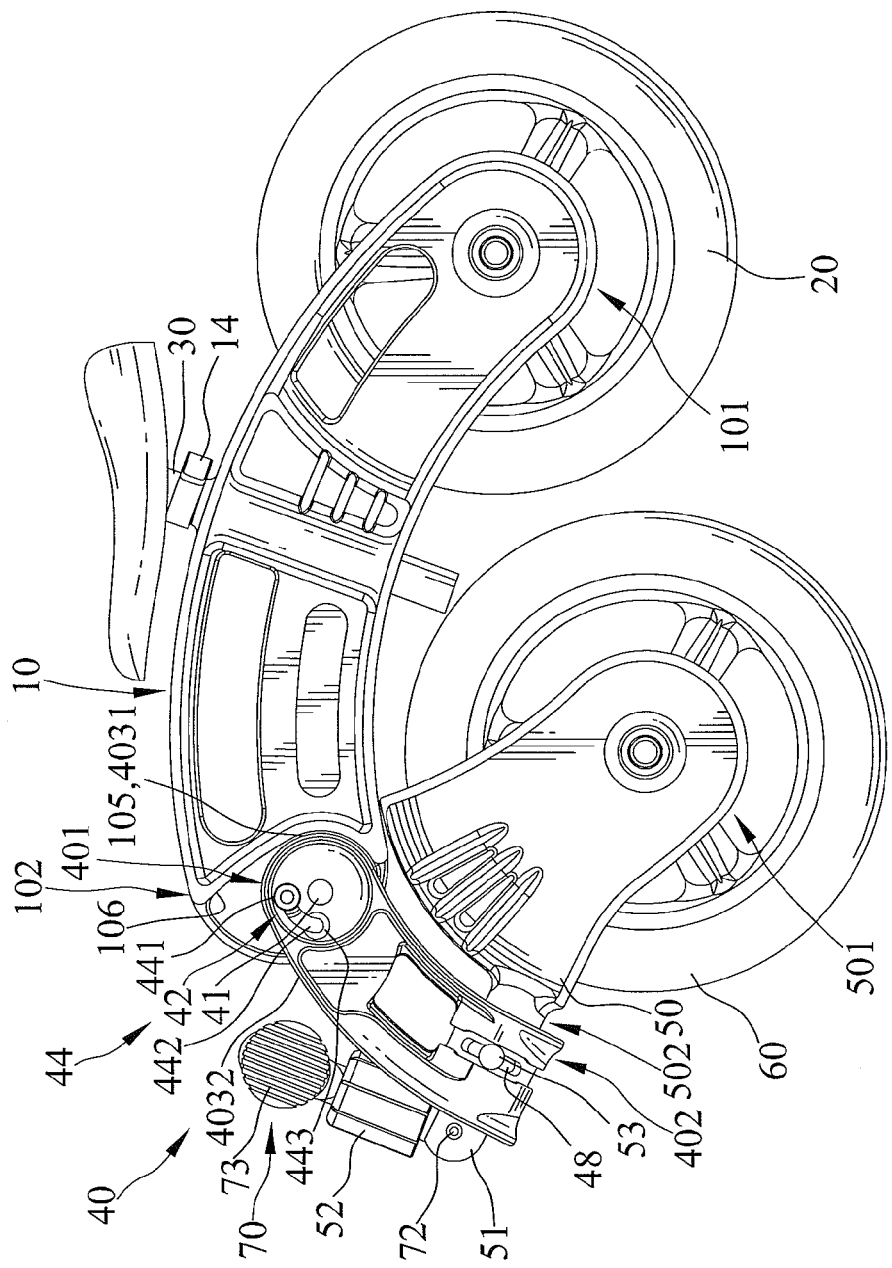
FIG. 11 is a front view similar to that of FIG. 10, but shows a steering handle in a collapsed position.
Figure 12:
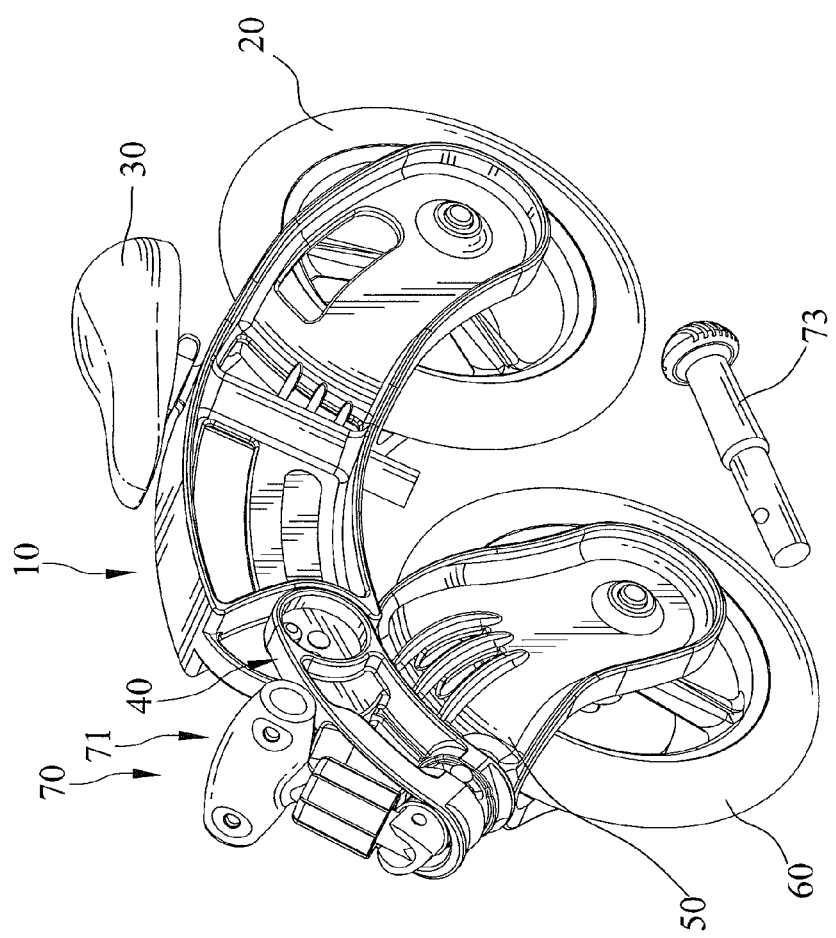
FIG. 12 is an extended view of FIG. 11 and shows grips disengaged from the steering handle.
Figure 13:
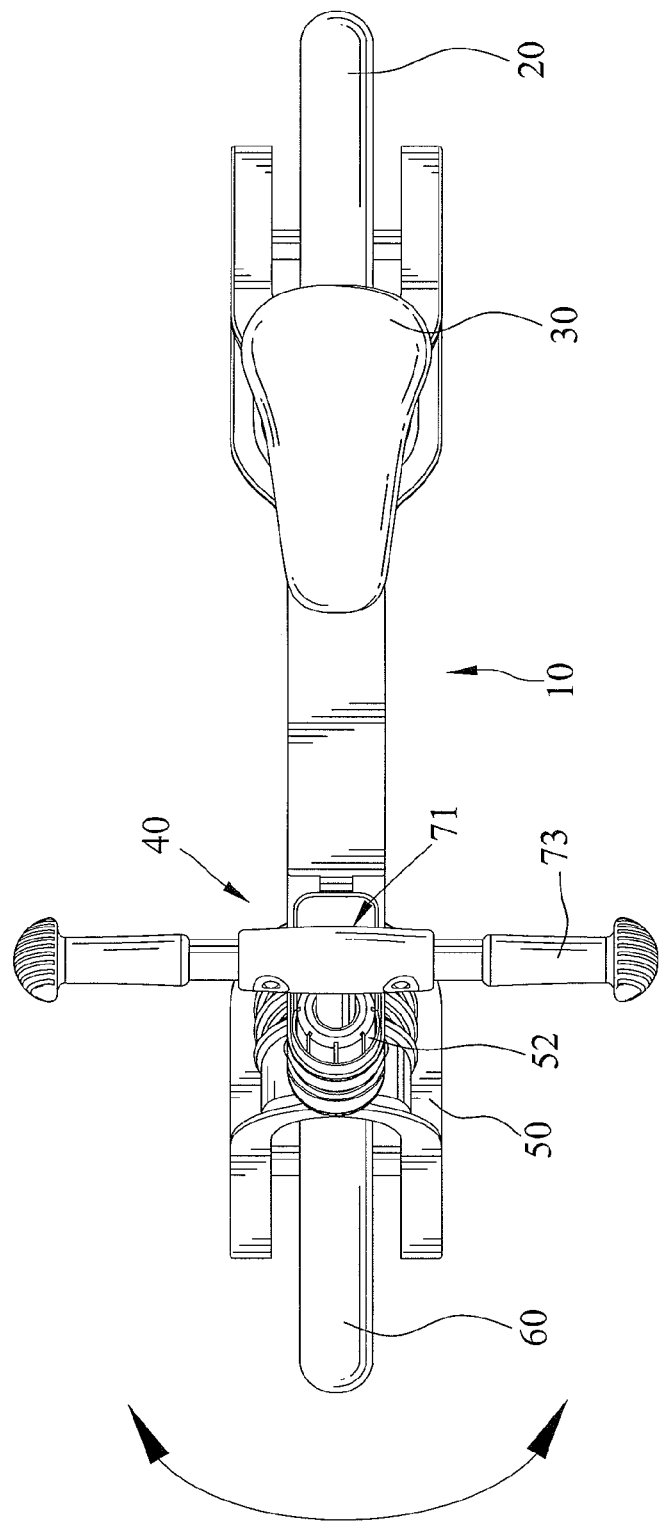
FIG. 13 is a top view of the balance bike of FIG. 1 and shows the steering handle in a first orientation.
Figure 14:
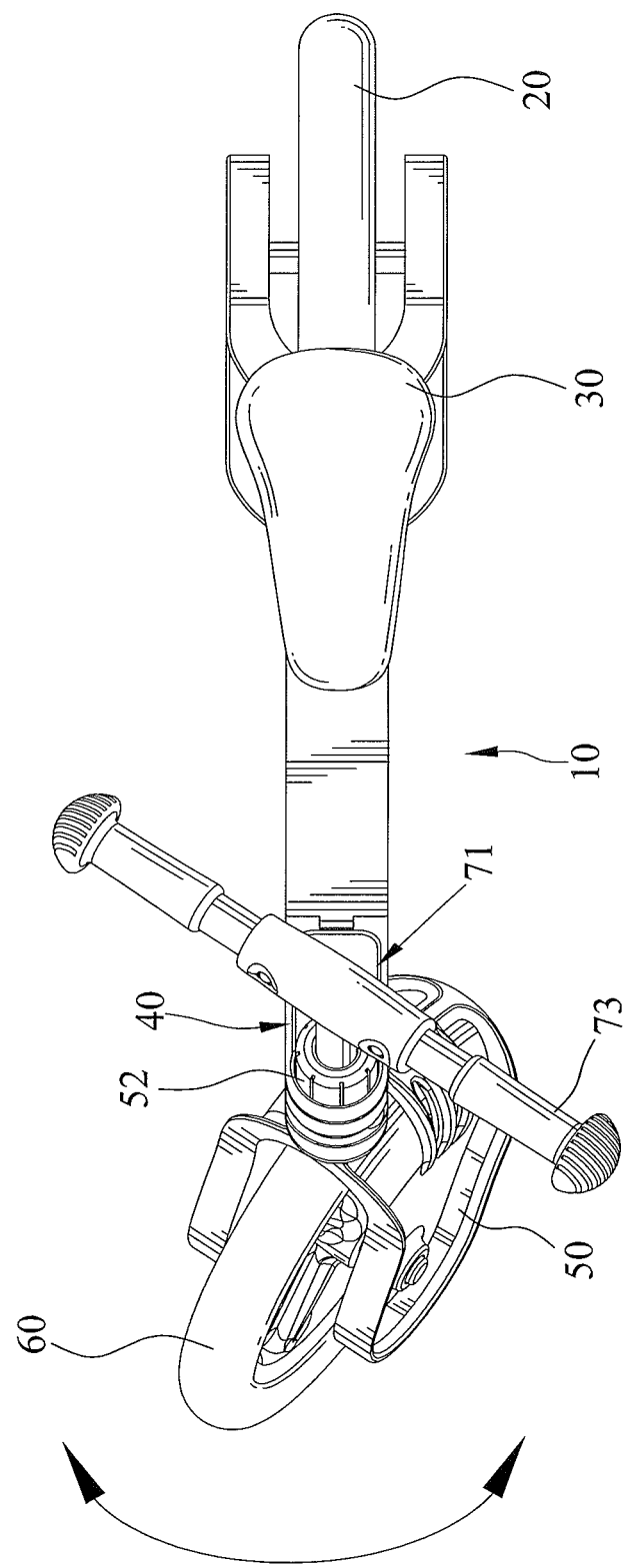
FIG. 14 is an extended top view of FIG. 13 and shows the steering handle in a second orientation.
Figure 15:
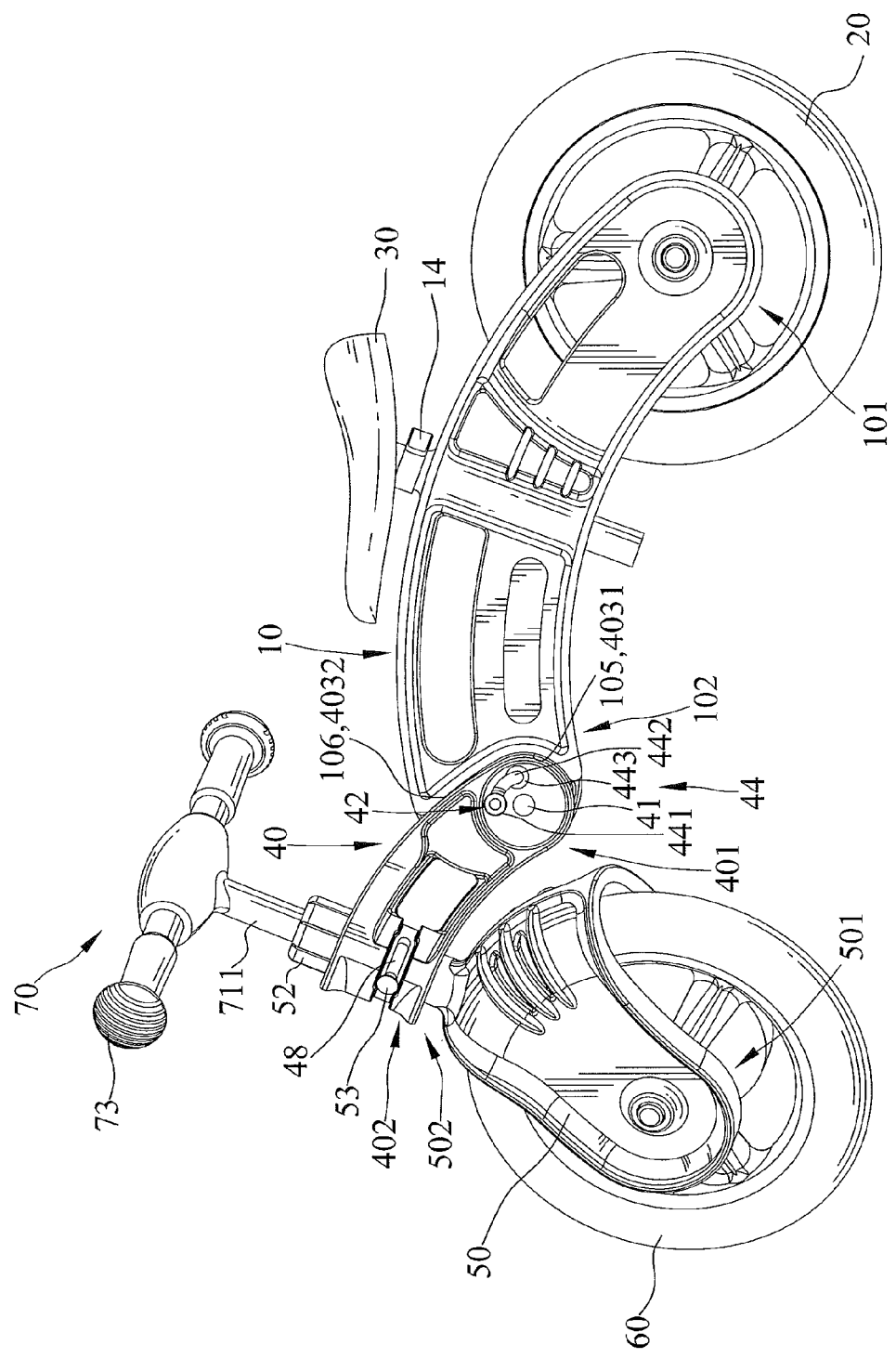
FIG. 15 is a perspective view of the balance bike of FIG. 1 and shows the steering handle limited to be turned in a first direction but capable of being turned in a second direction opposite to the first direction.
Figure 16:
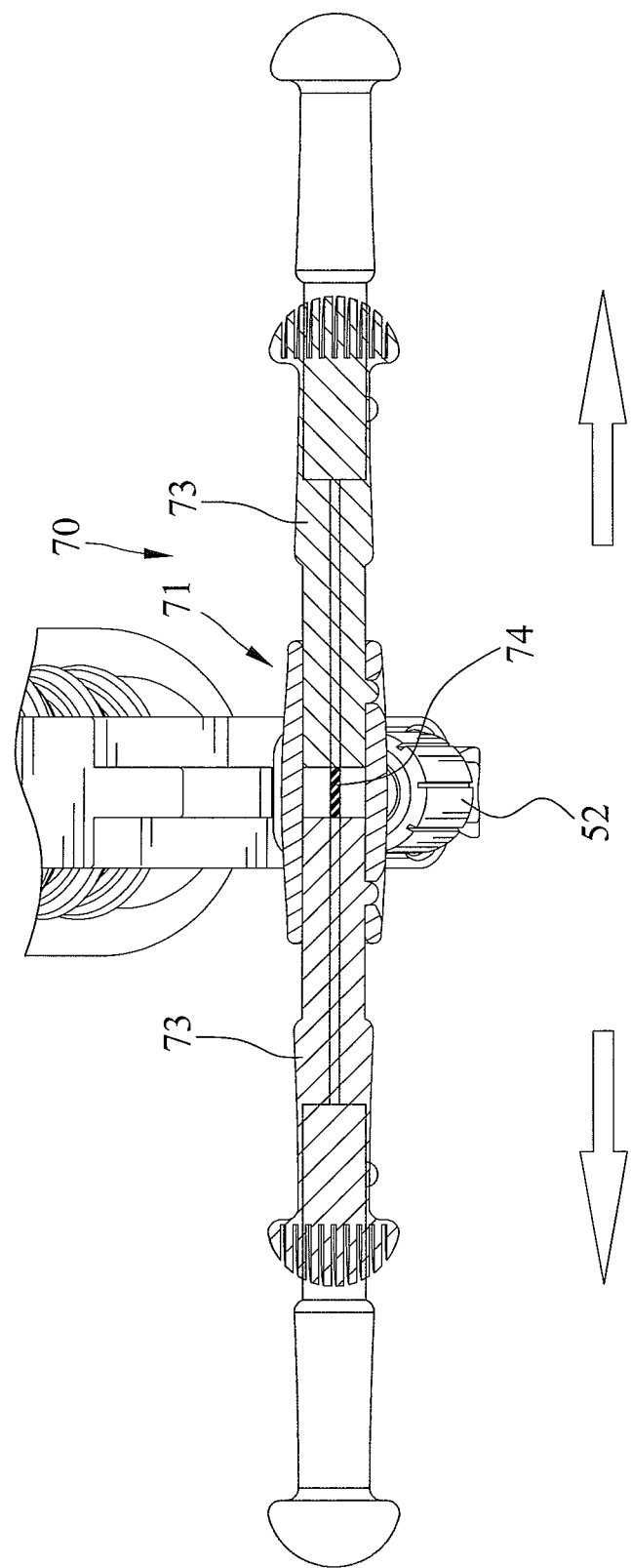
FIG. 16 is a perspective view of a balance bike in accordance with a second embodiment of the present invention, with the second embodiment similar to the first embodiment except that two grips are interconnected by a connector.

Referring to FIGS. 1 through 16, a balance bike in accordance with the present invention includes a frame 10, a rear wheel 20, a seat 30, a joining structure 40, a front fork 50, a front wheel 60, and a steering handle 70.

The frame 10 includes a first end 101 and a second end 102 opposite to the first end 101. The frame 10 has a body 103. The body 103 of the frame 10 includes a protrusion defining a connecting end 104. The frame 10 further includes first and second connecting portions 11 and 12. The first and second connecting portions 11 and 12 are disposed on the connecting end 104.

The rear wheel 20 for the mobility of the balance bike is engaged with the frame 10.

The seat 30 is engaged with the frame 10 and adjustable to different heights relative to the frame 10. The frame 10 includes a cavity 13. The cavity 13 has two distal ends. Each distal end of the cavity 13 forms an open end. The seat 30 includes a seat post (not numbered) adjustably engaged in the cavity 13. Further, a clamping member 14 is engaged with the seat 30. The clamping member is engaged with the seat post of the seat 30. The clamping member 14 is operable between a tightened position and a released position. The seat 30 is prevented from being adjustably moved when the clamping member 14 is in the tightened position. The seat 30 is adjustably movable relative to the frame 10 when the clamping member 14 is in the released position.

The joining structure 40 is pivotally joined to the frame 10. The joining structure 40 is pivotal between first and second positions relative to the frame 10. The joining structure 40 and the frame 10 include a first pivot 41 interconnecting therewith for connection between the joining structure 40 and the frame 10. The joining structure 40 includes a joining end 401. Furthermore, the joining structure 40 includes two lugs including first and second lugs 403 and 404. The first and second lugs 403 and 404 define the joining end 401. The first and second lugs 403 and 404 are disposed opposite to each other and in a spaced relationship. The first and second lugs 403 and 404 include a space 405 defined therebetween. The connecting end 104 is received in the space 405 and disposed between the first and second lugs 403 and 404. The first and second lugs 403 and 404 and the connecting end 104 include the first pivot 41 engaged therewith. Additionally, the joining end 401 includes an aperture and a through slot extending in the first and second lugs 403 and 404. First and second apertures 43 and 45 and first and second through slots 44 and 46 are defined. The first aperture 43 is defined on the first lug 403, and the second aperture 45 is defined on the second lug 404 respectively. The first pivot 41 is engaged in the first and second apertures 43 and 45. The first through slot 44 is defined on the first lug 403, and the second through slot 46 is defined on the second lug 404 respectively. The first through slot 44 forms first and second retraining ends 441 and 443 disposed opposite to each other and an extension 442 disposed between and interconnecting the first and second retaining ends 441 and 443. The extension 442 has an arcuate shape. Likewise, the second through slot 46 forms first and second retraining ends 461 and 463 disposed opposite to each other and an extension 462 disposed between and interconnecting the first and second retaining ends 461 and 463. The extension 462 has an arcuate shape.

The joining structure 40 and the frame 10 further include a positioning mechanism 42 engaged therewith. The first and second lugs 403 and 404 and the connecting end 104 include the positioning mechanism 42 engaged therewith. The positioning mechanism 42 includes a detent 421 engaged with the second connecting portion 12 and the joining end 401. The detent 421 is engaged in the first and second through slots 44 and 46. Further, a retainer 422 is engaged with the detent 421 to prevent the detent 421 from disengagement from the first and second through slots 44 and 46. The detent 421 includes a head 4211 and a shank 4212. The head 4211 has a first cross-sectional size. The first and second through slots 44 and 46 has a second cross-sectional size. The first cross-sectional size is greater than the second cross-sectional size. The shank 4212 has a third cross-sectional size not greater than the second cross-sectional size. The retainer 422 has an inner threading 4221. The shank 4212 has an outer threading (not numbered). The detent 421 and the retainer 422 are in thread engagement. The detent 421 is disposed at a first location when the joining structure 40 is in the first position and at a second location when the joining structure 40 is in the second position respectively. The detent 421 is securely retained in the first retaining ends 441 and 443 when the joining structure 40 is in the first position. The detent 421 is securely retained in the second retaining ends 461 and 463 when the joining structure 40 is in the second position.

The frame 10 includes a first peripheral edge and the joining structure 40 includes a second peripheral edge. The first peripheral edge includes a first peripheral segment 105 and a second peripheral segment 106 extending from the first peripheral segment 105. The second peripheral edge defined on the first lug 403 includes a third peripheral segment 4031 and a fourth peripheral segment 4032 extending from the third peripheral segment 4031. The third and fourth peripheral segments 4031 and 4032 abut against the first and second peripheral segments 105 and 106 respectively when the joining structure 40 is in the first position. The fourth peripheral segment 4032 is disengaged from the second peripheral segment 106, and the third peripheral segment 4031 abuts against the first peripheral segment 105 when the joining structure 40 is in the second position. Likewise, the second peripheral edge defined on the second lug 404 includes a third peripheral segment 4041 and a fourth peripheral segment 4042 extending from the third peripheral segment 4041. The third and fourth peripheral segments 4041 and 4042 abut against the first and second peripheral segments 105 and 106 respectively when the joining structure 40 is in the first position. The fourth peripheral segment 4042 is disengaged from the second peripheral segment 106, and the third peripheral segment 4041 abuts against the first peripheral segment 105 when the joining structure 40 is in the second position.

Preferably, the first peripheral segment 105 and third peripheral segments 4031 and 4041 have a substantial arcuate contour. The second peripheral segment 106 and fourth peripheral segments 4032 and 4042 have a substantial straight contour.

The joining structure 40 further includes a receiving end 402. The receiving end 402 is disposed opposite to the joining end 401. The receiving end 402 includes a hole 47 and a groove 48. The hole 47 extends transversely to and connecting with the groove 48. The hole 47 extends longitudinally. The groove 48 extends circumferentially. Further, a flange 471 extends annularly on an wall that delimits the hole 47.

The front fork 50 is rotatably engaged with the receiving end of the joining structure 40. The front fork 50 includes a first end 501, a second end 502 opposite to the first end 501, a steerer tube 51, a sleeve 52, and a linking member 53. The steerer tube 51 is rotatably engaged in the hole 47. The steerer tube 51 includes a crown 511, a first orifice 512, a plurality of fixing sections 513, a second orifice 514, and an opening 515. The sleeve 52 is adjustably engaged with the steerer tube 51. The sleeve 52 is adjustable between first and second positions relative to the steerer tube 51. The sleeve 52 can move in a direction toward the crown 511. The crown 511 can prevent the sleeve 52 from passing it. The sleeve 52 includes an inner peripheral wall including a plurality of fixing sections 521. The plurality of fixing sections 513 of the steerer tube 51 and the plurality of fixing sections 521 of the sleeve 52 are adjustably engaged with each other. In the embodiment, the steerer tube 51 includes an outer threading defining the plurality of fixing section 513, and the sleeve 52 includes an inner threading defining the plurality of fixing sections 521. The linking member 53 is engaged with the steerer tube 51. The linking member 53 is inserted through the first orifice 512 of the steerer tube 51. The linking member 53 extends through and is movably engaged in the groove 48. The linking member 53 moves in the groove 48 upon rotating the front fork 50. The linking member 53 is limited to move between two distal ends of the groove 48.

The front wheel 60 for the mobility of the balance bike is engaged with the front fork 50.

The steering handle 70 for a user to grasp to steer the balance bike is engaged with the front fork 50. Preferably, the steering handle 70 is pivotally engaged with the front fork 50. The steering handle 70 includes a joint 71 including a stem 711 pivotally joined to the steerer tube 51. The stem 711 and the steerer tube 51 include a second pivot 72 interconnecting therewith for connection between the front fork 50 and the steering handle 70. The joint 71 further includes a handle bar 712, an aperture 713, two cavities 714, two positioning holes 715. The second pivot 72 is inserted into the aperture 713. The steering handle 70 further includes two grips 73 releasably locked to the joint 71 and disposed opposite to each other.

Each grip 73 is operable between an extended position and a collapsed position. Each grip 73 is engaged with the joint 71 when the grip is in the extended position. Each grip 73 is disengaged with the joint 71 when the grip is in the collapsed position. The two grips 73 are received at two ends of the handle bar 712. The two cavities 714 are defined at the two ends of the handle bar 712. One of the two grips 73 has a distal end inserted into one of the two cavities 714, and the other grip 73 has a distal end inserted into the other of the two cavities 714 respectively. Each grip 73 has a locking mechanism 731. The two grips 73 include the locking mechanisms 731 engaged in the two positioning holes 715 when locked to the joint 71. Further, a connector 74 engages with the two grips 73. The connector 74 is disposed in the handle bar 712. The connector 74 interconnects the two grips 73 and includes one of two ends linked to one of the two grips 73 and the other end linked to the other grip 73.

Furthermore, the sleeve 52 is partially received in the hole 47 and includes a first length receiving the steerer tube 51 and a second length receiving the stem 711 when in the first position. The steering handle 70 is prevented from pivoting relative to the front fork 50 when the sleeve 52 is in the first position. The sleeve 52 is not received in the hole 47 and does not receive the steerer tube 51 when the sleeve is in the second position. Moreover, the steering handle 70 is capable of being pivoted relative to the front fork 50 when the sleeve is in the second position.

The steering handle 70 is operable between an extended position and a collapsed position. The sleeve 52 is disposed at the first position when the steering handle 70 is in the extended position. The sleeve 52 is disposed at the second position when the steering handle 70 is in the collapsed position. Additionally, the joining structure 40 includes a receptacle 49. The sleeve 52 is received in the receptacle 49 when the steering handle 70 is in the collapsed position.

Furthermore, the steering handle 70 rotates synchronously with the front fork 50. Additionally, the linking member 53 and the front fork 50 as well as the steering handle 70 are limited to be turned clockwise or counterclockwise through an angle not exceeding 360 degrees. The link member 53 and the front fork 50 as well as the steering handle 70 face forward in a first orientation when the balance bike is to be moved in a straight line. The angle that the linking member 53 and the front fork 50 as well as the steering handle 70 can be turned clockwise or counterclockwise from the first orientation is limited to 60 degrees The front and rear wheels 60 and 20 are disposed apart from each other, and the balance bike defines a first longitudinal dimension when the joining structure 40 is in the first position. The front and rear wheels 60 and 20 are disposed adjacent to each other, and the balance bike defines a second longitudinal dimension when the joining structure 40 is in the second position, The first longitudinal dimension is larger than the second longitudinal dimension. When riding the balance bike, the joining structure 40 is in the first position.

In view of the forgoing, the balance bike can be folded into a compact form. Additionally, the steering handle 70 rotates synchronously with the front fork 50. The linking member 53 and the front fork 50 as well as the steering handle 70 are limited to be turned clockwise or counterclockwise through an angle not exceeding 360 degrees for safe riding.

While the specific embodiments have been illustrated and described, numerous modifications come to mind without significantly departing from the spirit of invention, and the scope of invention is only limited by the scope of accompanying claims.

What is claimed is:
1. A balance bike comprising:
a frame including first and second connecting portions;
a rear wheel for the mobility of the balance bike engaged with the frame;
a seat engaged with the frame and adjustable to different heights relative to the frame;
a joining structure pivotally joined to the frame, wherein the joining structure is pivotal between a first position and a second position relative to the frame, wherein the joining structure comprises a joining end and a receiving end;
a first pivot interconnects the joining structure and the frame for connection between the joining structure and the frame, wherein the first pivot is engaged between the first connecting portion of the frame and the joining end of the joining structure, wherein the joining structure further comprises a positioning mechanism engaged with the frame, wherein the positioning mechanism comprises a detent engaged with the second connecting portion of the frame and the joining end of the joining structure, wherein the detent is disposed at a first location when the joining structure is in the first position and the detent is disposed at a second location when the joining structure is in the second position respectively;
a front fork rotatably engaged with the receiving end of the joining structure;
a front wheel for the mobility of the balance bike engaged with the front fork; and
a steering handle pivotally engaged with the front fork for a user to grasp to steer the balance bike engaged with the front fork;
wherein the front and rear wheels are disposed apart from each other and the balance bike defines a first longitudinal dimension when the joining structure is in the first position, wherein the front and rear wheels are disposed adjacent to each other and the balance bike defines a second longitudinal dimension when the joining structure is in the second position, and wherein the first longitudinal dimension is larger than the second longitudinal dimension; and
wherein the receiving end of the joining structure includes a hole and a groove, with the hole extending transversely to and connecting with the groove, with the hole extending longitudinally, with the groove extending circumferentially, wherein the front fork comprises a steerer tube rotatably engaged in the hole and a linking member engaged with the steerer tube and extended through the groove, with the linking member movably engaged in the groove, wherein the linking member moves in the groove upon rotating the front fork, wherein the linking member is limited to move between two distal ends of the groove, wherein the steering handle rotates synchronously with the front fork, and wherein the linking member and the front fork as well as the steering handle are limited to be turned clockwise or counterclockwise through an angle not exceeding 360 degrees.

2. The balance bike as claimed in claim 1, wherein the joining end of the joining structure comprises a through slot, with the through slot forming first and second retraining ends disposed opposite to each other, wherein an extension is disposed between and interconnects the first and second retaining ends, wherein the extension has an arcuate shape, wherein the detent is securely retained in the first retaining end when the joining structure is in the first position, and wherein the detent is securely retained in the second retaining end when the joining structure is in the second position.

3. The balance bike as claimed in claim 1, wherein the joining structure comprises two lugs defining the joining end, wherein the first and second lugs are disposed opposite to each other and in a spaced relationship, wherein the first and second lugs comprise a space defined therebetween, wherein the frame comprises a protrusion defining a connecting end, wherein the first and second connecting portions are disposed on the connecting end of the frame, wherein the connecting end of the frame is received in the space and disposed between the first and second lugs, and wherein the two lugs and the connecting end of the frame are engaged with the first pivot and the positioning mechanism.

4. The balance bike as claimed in claim 1, wherein the frame comprises a first peripheral edge and the joining structure comprises a second peripheral edge respectively, wherein the first peripheral edge has a first peripheral segment and a second peripheral segment extending from the first peripheral segment, wherein the second peripheral edge has a third peripheral segment and a fourth peripheral segment extending from the third peripheral segment, wherein the third and fourth peripheral segments abut against the first and second peripheral segments respectively when the joining structure is in the first position, wherein the fourth peripheral segment is disengaged from the second peripheral segment and the third peripheral segment abuts against the first peripheral segment when the joining structure is in the second position.

5. The balance bike as claimed in claim 4, wherein each of the first and third peripheral segments has a substantial arcuate contour, and wherein each of the second and fourth peripheral segments has a substantial straight contour.

6. A balance bike comprising:
a frame including first and second connecting portions;
a rear wheel for the mobility of the balance bike engaged with the frame;
a seat engaged with the frame and adjustable to different heights relative to the frame;
a joining structure pivotally joined to the frame, wherein the joining structure is pivotal between a first position and a second position relative to the frame, wherein the joining structure comprises a joining end and a receiving end;
a first pivot interconnects the joining structure and the frame for connection between the joining structure and the frame, wherein the first pivot is engaged between the first connecting portion of the frame and the joining end of the joining structure, wherein the joining structure further comprises a positioning mechanism engaged with the frame, wherein the positioning mechanism comprises a detent engaged with the second connecting portion of the frame and the joining end of the joining structure, wherein the detent is disposed at a first location when the joining structure is in the first position and the detent is disposed at a second location when the joining structure is in the second position respectively;
a front fork rotatably engaged with the receiving end of the joining structure;
a front wheel for the mobility of the balance bike engaged with the front fork; and
a steering handle pivotally engaged with the front fork for a user to grasp to steer the balance bike engaged with the front fork;
wherein the front and rear wheels are disposed apart from each other and the balance bike defines a first longitudinal dimension when the joining structure is in the first position, wherein the front and rear wheels are disposed adjacent to each other and the balance bike defines a second longitudinal dimension when the joining structure is in the second position, and wherein the first longitudinal dimension is larger than the second longitudinal dimension; and
wherein the front fork as well as the steering handle face forward in a first orientation when the balance bike is to be moved in a straight line, and wherein the front fork as well as the steering handle are limited to be turned no more than 60-degrees from the first orientation.

7. A balance bike comprising:
a frame including first and second connecting portions;
a rear wheel for the mobility of the balance bike engaged with the frame;
a seat engaged with the frame and adjustable to different heights relative to the frame;
a joining structure pivotally joined to the frame, wherein the joining structure is pivotal between a first position and a second position relative to the frame, wherein the joining structure comprises a joining end and a receiving end;
a first pivot interconnects the joining structure and the frame for connection between the joining structure and the frame, wherein the first pivot is engaged between the first connecting portion of the frame and the joining end of the joining structure, wherein the joining structure further comprises a positioning mechanism engaged with the frame, wherein the positioning mechanism comprises a detent engaged with the second connecting portion of the frame and the joining end of the joining structure, wherein the detent is disposed at a first location when the joining structure is in the first position and the detent is disposed at a second location when the joining structure is in the second position respectively;
a front fork rotatably engaged with the receiving end of the joining structure;
a front wheel for the mobility of the balance bike engaged with the front fork; and
a steering handle pivotally engaged with the front fork for a user to grasp to steer the balance bike engaged with the front fork;
wherein the front and rear wheels are disposed apart from each other and the balance bike defines a first longitudinal dimension when the joining structure is in the first position, wherein the front and rear wheels are disposed adjacent to each other and the balance bike defines a second longitudinal dimension when the joining structure is in the second position, and wherein the first longitudinal dimension is larger than the second longitudinal dimension; and
wherein the front fork further comprises a sleeve adjustably engaged with a steerer tube, wherein steering handle comprises a joint comprising a stem pivotally joined to the steerer tube, wherein a second pivot interconnects the stem and the steerer tube for connection between the front fork and the steering handle, wherein the sleeve is adjustable between first and second positions relative to the steerer tube, wherein the sleeve is partially received in the hole and has a first length receiving the steerer tube and a second length receiving the stem when in the first position, wherein the steering handle is prevented from pivoting relative to the front fork when the sleeve is in the first position, wherein the sleeve is not received in the hole and not receiving the steerer tube, and wherein the steering handle is capable of being pivoted relative to the front fork when the sleeve is in the second position.

8. The balance bike as claimed in claim 7, wherein the steering handle is operable between an extended position and a collapsed position, wherein the sleeve is disposed at the first position when the steering handle is in the extended position, wherein the sleeve is disposed at the second position when the steering handle is in the collapsed position, wherein the joining structure comprises a receptacle, and wherein the sleeve is received in the receptacle when the steering handle is in the collapsed position.

* * * * *